US008625943B2

(12) United States Patent
Soma et al.

(10) Patent No.: US 8,625,943 B2
(45) Date of Patent: Jan. 7, 2014

(54) WAVEGUIDE DEVICE AND MODULE

(75) Inventors: Shunichi Soma, Atsugi (JP); Takashi Goh, Atsugi (JP); Yasuaki Hashizume, Atsugi (JP); Masahiro Yanagisawa, Atsugi (JP); Takanori Ishikawa, Yokohama (JP); Mitsuru Nagano, Yokohama (JP); Atsushi Murasawa, Yokohama (JP); Masayuki Okuno, Yokohama (JP)

(73) Assignees: Nippon Telegraph and Telephone Corporation, Tokyo (JP); NTT Electronics Corporation, Yokohama-shi, Kanagawa (JP)

( * ) Notice: Subject to any disclaimer, the term of this patent is extended or adjusted under 35 U.S.C. 154(b) by 424 days.

(21) Appl. No.: 12/994,280

(22) PCT Filed: May 26, 2009

(86) PCT No.: PCT/JP2009/059624
§ 371 (c)(1),
(2), (4) Date: Nov. 23, 2010

(87) PCT Pub. No.: WO2009/145199
PCT Pub. Date: Dec. 3, 2009

(65) Prior Publication Data
US 2011/0064355 A1 Mar. 17, 2011

(30) Foreign Application Priority Data

May 26, 2008 (JP) .................................. 2008-136823

(51) Int. Cl.
*G02B 6/26* (2006.01)
(52) U.S. Cl.
USPC ................ 385/38; 385/14; 385/139; 385/140

(58) Field of Classification Search
None
See application file for complete search history.

(56) References Cited

U.S. PATENT DOCUMENTS 4,998,795 A * 3/1991 Bowen et al. ................... 385/78
5,121,182 A * 6/1992 Kuroda et al. ................ 257/432
(Continued)

FOREIGN PATENT DOCUMENTS

AU          640031       8/1993
CA         2046376       1/1992
(Continued)

OTHER PUBLICATIONS

Office Action dated Sep. 19, 2012, issued in corresponding Chinese Application No. 200980119556.X.

(Continued)

*Primary Examiner* — Mike Stahl
(74) *Attorney, Agent, or Firm* — Workman Nydegger

(57) ABSTRACT

Excess optical power in a waveguide device is appropriately terminated. According to one embodiment of the present invention, the waveguide device comprises a termination structure filled with a light blocking material for terminating light from the end section of a waveguide. This termination structure can be formed by forming a groove on an optical waveguide by removing the clad and core, and filling the inside of that groove with a material attenuating the intensity of the light (light blocking material). In this manner, light that enters into the termination structure is attenuated by the light blocking material, and influence on other optical devices as a crosstalk component can be suppressed. With such termination structure, not only the influence on optical devices integrated on the same substrate, but also the influence on other optical devices directly connected to that substrate can be suppressed.

17 Claims, 15 Drawing Sheets

(56) References Cited

U.S. PATENT DOCUMENTS

| | | | |
|---|---|---|---|
| 5,321,779 A * | 6/1994 | Kissa | 385/14 |
| 6,298,178 B1 * | 10/2001 | Day et al. | 385/14 |
| 7,212,711 B2 * | 5/2007 | Kondo | 385/49 |
| 2001/0053260 A1 | 12/2001 | Takizawa et al. | |
| 2002/0001427 A1 * | 1/2002 | Hashimoto et al. | 385/14 |
| 2003/0002844 A1 * | 1/2003 | DeRosa et al. | 385/139 |
| 2003/0147618 A1 * | 8/2003 | Guy et al. | 385/139 |
| 2004/0120633 A1 * | 6/2004 | Gao et al. | 385/14 |
| 2005/0105842 A1 * | 5/2005 | Vonsovici et al. | 385/14 |
| 2006/0110089 A1 * | 5/2006 | Ichikawa et al. | 385/3 |
| 2006/0188212 A1 * | 8/2006 | Oron et al. | 385/139 |
| 2008/0298743 A1 * | 12/2008 | Saravanos et al. | 385/14 |
| 2012/0057841 A1 * | 3/2012 | Wysocki et al. | 385/139 |
| 2012/0251041 A1 * | 10/2012 | Ishikawa et al. | 385/14 |

FOREIGN PATENT DOCUMENTS

| | | |
|---|---|---|
| CN | 1831646 A | 9/2006 |
| EP | 0 467 571 | 1/1992 |
| FI | 925372 | 11/1992 |
| GB | 2 245 935 | 1/1992 |
| JP | 58-116784 | 7/1983 |
| JP | 4-237030 | 8/1992 |
| JP | 9-152513 | 6/1997 |
| JP | 2001-133666 | 5/2001 |
| JP | 2001-330746 | 11/2001 |
| JP | 2003-270460 | 9/2003 |
| JP | 2005-024891 | 1/2005 |
| JP | 3755762 | 1/2006 |
| JP | 2006-235380 | 9/2006 |
| WO | WO92/01161 | 1/1992 |
| WO | 2004074874 | 9/2004 |
| WO | 2007/148127 A2 | 12/2007 |

OTHER PUBLICATIONS

S. Suzuki et al., *Compactly Integrated 32-Channel AWG Multiplexer with Variable Optical Attenuators and Power Monitors Based on Multi-chip PLC Technique*, Optical Fiber communication conference, 2004, OFC 2007, vol. 2, ISBN 1-22752-772-5.

Yasuaki Hashizume et al., *Compact 32-Channel 2×2 Optical Switch Array Based on PLC Technology for OADM Systems*, ECOC 2003, MO3-5-4.

PCT/JP2009/059624, Mail Date Jun. 23, 2009, International Search Report.

Office Action dated Nov. 13, 2012, issued in corresponding Japanese Application No. 2008-136823 with English translation.

PCT Form/IB/338 dated Jan. 20, 2011 from International Application No. PCT/JP2009/059624.

Japanese Office Action received for related Japanese Application No. 2008-136823, Sep. 24, 2013.

* cited by examiner

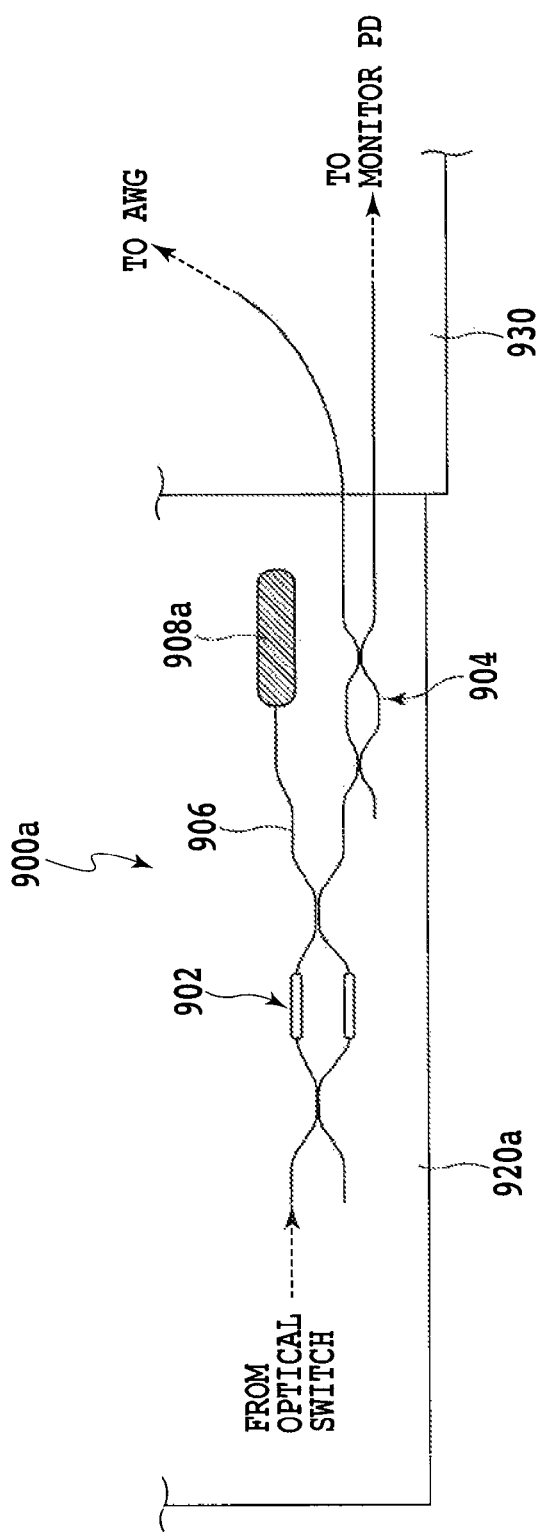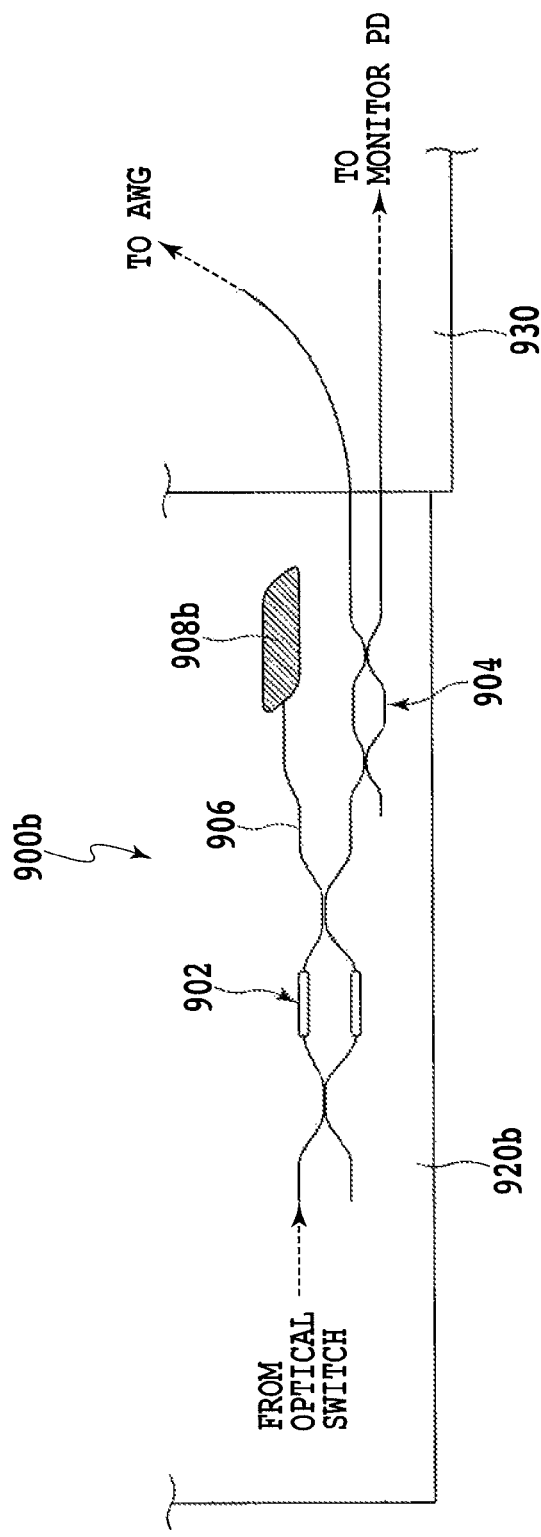

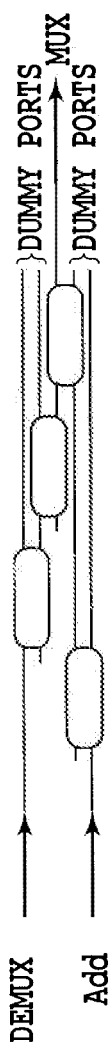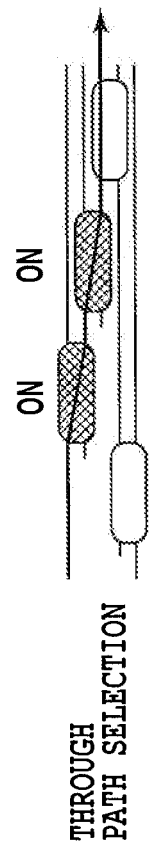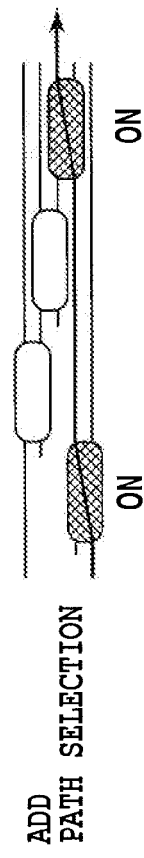
FIG.10A
FIG.10B
FIG.10C

WAVEGUIDE DEVICE AND MODULE

TECHNICAL FIELD

The present invention relates to an optical device using a waveguide on a substrate. More particularly, the present invention relates to terminating a waveguide, which is not connected to an input or output fiber, at an arbitrary location on the substrate, and attenuating the intensity of an optical signal propagating through such waveguide.

BACKGROUND ART

Due to the explosive growth of broadband communications in homes, network contents are increasingly diversified. Generated along with it, increased communication traffic and expanded communication services are pressing demands for larger capacity, higher speed and greater functionality of the backbone communication networks on a daily basis. In recent years, optical communication technologies have served an important role in meeting these demands. Further, in past optical networks, point-to-point type communication systems connecting between two points by optical to electrical and electrical to optical conversion signal processing have been a mainstream. However, in the future, it is essential to deploy mesh-type communication that connects multiple points using optical signals without conversion to electrical signals on all networks, including access networks, so that more diversified use of communication by each user can be realized.

A waveguide device is an example of components that perform an important role in this optical communication system. In applications of optical interference principle, various functions such as an optical signal splitting/coupling device, a wavelength multiplexing/demultiplexing device, an interleave filter, an optical switch, a variable optical attenuator (VOA), and the like have been achieved. These devices are waveguide-type devices, so they have flexibility in design, and can easily be made on a large scale and with high integration. Not only that, since semiconductor component such as LSI manufacturing processes can be used, it is expected that these devices will be excellent for mass production. While various devices such as waveguides using semiconductors and polymer materials have been put to practical use, especially silica waveguides fabricated on a silicon substrate have properties such as low loss, stability and superior coupling with optical fibers, and are one of waveguide devices for which practical applications have been most advanced.

One of schemes for an optical communication system node constructed using these waveguide devices is a reconfigurable add/drop multiplexing (ROADM) which is used for wavelength division multiplexing (WDM) signal. This scheme has a function of sending all signals to adjacent nodes after transferring with a lower layer network only for arbitrary WDM channel signals in a node, and is mainly used as a scheme for configuring a ring network. The optical devices necessary for achieving this function include a wavelength multiplexing/demultiplexing filter for multiplexing or demultiplexing WDM signal for each wavelength, an optical switch for switching a signal path, a VOA for adjusting optical intensity of a signal, an optical signal transmitter/receiver, an optical intensity monitor and the like, and in particular, a wavelength multiplexing/demultiplexing filter, an optical switch and a VOA and the like can be achieved using waveguide devices.

In recent years, these waveguide devices have been integrated in a single module, making it possible to configure a highly functional optical device which realizes the major functions of a ROADM system, and deployments into actual network systems have actively been put forward. FIG. 14 is, as one example, a block diagram of a circuit integrated with wavelength multiplexing/demultiplexing filters (1404, 1406, 1416), optical switches (1408-1 to N), VOAs (1410-1 to N), optical couplers (1402, 1412-1 to N) and photo detectors (PD) for monitoring (1414-1 to N) as one module 1400. According to the example of FIG. 14, the WDM signal that enters the main path from the input (In) is first split by the tap optical coupler 1402. Then, one of the split signals is separated into individual wavelength signals by a DEMUX filter 1404 for drop path and only the signals having the wavelength used by a lower-layer network is detected. The other signal is also separated into individual wavelength signals by a different DEMUX filter 1406, and then passing through 2×1 optical switches 1408-1 to N which select either the signals from Add path, transmitted from the lower-layer network, or the signals from the main path. In the 2×1 optical switches, the signals from the Add path are selected only for the wavelengths that correspond to the wavelength signals detected earlier in the drop path. Furthermore, the signal level of each wavelength is adjusted by the VOA 1410-1 to N, and the output is monitored by means of the tap optical coupler 1412-1 to N and monitor PD 1414-1 to N connected thereafter, and fed back to control the attenuation at the VOA. The level-adjusted signal of each wavelength become a WDM signal through a wavelength multiplexing (MUX) filter 1416, and then is going out from the output (out) of the main path.

According to a conventional technology, implementation of module is realized by connecting these individual optical devices each other via optical fiber in the module. However, in the future, in order to make a module more compact, larger scale and lower power consumption, further improvement in integration is a substantial challenge.

One of technologies that have been proposed to meet this requirement of improving integration is a multi-chip integration technology. This is a technology in which individual waveguide device substrates are directly connected together without using optical fibers, so that waveguide devices themselves can be smaller and the mounting area inside the module can be reduced. For example, in the configuration of FIG. 14, the wavelength multiplexing and demultiplexing filters 1406, 1416 are manufactured as one waveguide device substrate 1420. Similarly, the optical switches 1408-1 to N, the VOAs 1410-1 to N, and the optical couplers 1412-1 to N are manufactured as one waveguide device substrate 1430. Then, when connecting, the substrates are connected each other directly, not via optical fiber. In addition, the monitor PDs 1414-1 to N are not waveguide devices, but can be connected, not via optical fiber, to the monitor ports for the optical couplers 1412-1 to N, on the end surface of the wavelength multiplexing/demultiplexing filter substrate 1420, or the end surface of the optical switch substrate 1430. With this technique, the length of optical fiber used in the module 1400 and the number of parts for connecting optical fiber to the substrates 1420, 1430 can be eliminated, and as a result, the mounting area inside the module is reduced, improving integration of the devices. In this case, a VOA bears the function of adjusting the optical level of the passing optical signal by an attenuation operation and suppressing level deviation between the channels.

The most basic configuration of a VOA using a waveguide device is illustrated in FIG. 15A. This VOA 1500 is a Mach-Zehnder Interferometer (MZI) type optical device, which comprises two directional couplers 1504 and 1508 for splitting or coupling an optical signal and arm waveguides 1506a, 1505b, with thin film heaters 1512a, 1512b being formed on the arm waveguides 1506a, 1506b. An incident optical signal from a port 1502a is split by the directional coupler 1504, respectively propagating along the arm waveguides 1506a and 1506b, and combined again by the directional coupler 1508. On this occasion, when power is supplied to one of the thin-film heaters 1512a and 1512b from an electrode pad 1516, 1518, a phase difference occurs between the arm waveguides 1506a and 1505b, and the intensity of the optical signal output from the port 1510a or 1510b changes according to the phase relationship in the directional coupler 1508. When the phase difference is 0, the optical signal is output from port 1510b 100%, and when the phase difference is 71, output from port 1510a 100%. Taking advantage of this phenomenon, if this phase difference is adjusted by controlling the power supply to the thin-film heaters in analog fashion, the device can be used as a VOA. FIG. 15B is a cross-sectional diagram at section line XVB-XVB in FIG. 15A. The optical waveguide is fabricated on a silicon substrate 1520 and composed of clad 1522 made of a silica glass and a rectangular shaped core 1524 covered thereby. On both sides of the arm waveguides, there are heat-insulating grooves 1514 formed by removing the clad along the waveguides using an etching technique, which can lower the electric power required for switching or attenuation. Now, based on the MZI interference principle, even when error occurs in the coupling rate due to manufacturing error of the optical couplers, in order to obtain a sufficient extinction ratio or optical attenuation, the path from port 1502a to port 1510b, or the path from port 1502b to port 1510a (cross path) is typically used as the main signal path. Furthermore, when taking into consideration the power consumption or the polarization dependency of thermo-optical effect, most typically the optical signal will be blocked, or driven to achieve the maximum attenuation, when the thin-film heaters 1512a, 1512b are applied with no power. For that, it is required that a predetermined suitable difference (optical path length difference) is given to effective optical distances in the arm waveguides 1506a, 1506b over which the optical signals propagate through the waveguides, that is, the optical path lengths.

The optical attenuation operation in a VOA, having a MZI as the basic element and comprising two optical waveguides, not only attenuates the optical level of the main port (output waveguide connected to optical fiber or to other waveguide device), but also outputs the excess optical power (attenuated power) to other port (dummy port). For example, in a MZI-type VOA that uses a cross path as the main signal path, assuming port 1502a in FIG. 15A is an input, port 1510b becomes the main port and port 1510a becomes the dummy port. According to this conventional art, the excess optical power guided to the dummy port propagates to the output end surface of the waveguide device substrate and is generally emitted to the air directly.

Citation List
Patent Literature
PTL 1: Japanese Patent Publication No, 3755762
Non Patent Literature
NPL 1: Y. Hashizume, et. al., "Compact 32-channel 2×2 optical switch array based on PLC technology for OADM systems", ECOC2003, MO3-5-4

SUMMARY OF INVENTION

Technical Problem

However, as illustrated in FIG. 16, it becomes clear that a problem exists in the case of mounting using a multi-chip integration technique such as directly connecting the waveguide device substrate 1608 of the arrayed waveguide grating (AWG), monitor PD and the like to the waveguide device substrate including the VOA 1602 and tap optical coupler 1604. In other words, a part of the excess optical power from the VOA 1602 emitted from the end surface of the waveguide device substrate 1606 is coupled with the waveguide 1610 led from the tap optical coupler 1604 located in a subsequent stage from the VOA 1602, and as a result, causes branching ratio deviation or crosstalk, which degrades the circuit characteristics. In addition, this similarly causes various crosstalk to occur in the following AWG and monitor PD (not shown in the figure), which also causes degraded circuit characteristics.

Furthermore, when implementing waveguide devices using a normal optical fiber connection instead of using a multi-chip integration technique, as the degree of integration increases, the density of optical waveguides on the end surfaces of the waveguide device substrate dramatically increases, which reveals a problem causing a crosstalk by the propagated excess optical power coupling with the main path, or the excess optical power emitted from the end surfaces coupling with optical fibers.

Therefore, in waveguide devices, the appropriate termination treatment for the excess optical power has become a significant problem.

The present invention is directed to terminate the excess optical power in a waveguide device at an arbitrary location on the substrate without emission, and to suppress crosstalk to optical fibers and other waveguide devices.

Solution to Problem

In order to accomplish such an objective, the waveguide device according to one embodiment of the present invention is characterized in comprising a termination structure filled with a light blocking material for terminating light from an end section of a waveguide.

Moreover, the waveguide device according to one embodiment of the present invention is characterized in that the end section of the waveguide is tapered or in the form of a multi-mode interferometer.

Furthermore, the waveguide device according to one embodiment of the present invention is characterized in that the termination structure is configured such that the incident angle with respect to light from the end section of the waveguide is inclined.

In addition, the waveguide device according to one embodiment of the present invention is characterized in that the incident angle is Brewster's angle.

Moreover, the waveguide device according to one embodiment of the present invention is characterized in that the termination structure is configured to surround the end section of the waveguide.

Furthermore, the waveguide device according to one embodiment of the present invention is characterized in that the termination structure is configured as a groove of which shape in a horizontal plane of a substrate has no apex point and configured with curves.

Moreover, the waveguide device according to one embodiment of the present invention is characterized in that the waveguide device comprises at least one of a Mach-Zehnder type optical switch, a variable attenuator, an optical splitter and an arrayed waveguide diffraction grating.

Furthermore, the waveguide device according to one embodiment of the present invention is characterized in that the light blocking material is composed of a material that absorbs or scatters light from the end section of the waveguide.

A module according to one embodiment of the present invention is characterized in that a multi-chip module is integrated using these waveguide devices.

Advantageous Effects of Invention

According to the present invention, an optical waveguide is terminated in a waveguide device by forming a groove at an arbitrary point on a substrate by removing clad and core and filling inside of that groove with a material (light blocking material) which attenuates intensity of light. This attenuates the light entering into the termination structure by the light blocking material, and can suppress the influence of becoming crosstalk component to other optical devices. Accordingly, the influence, not only on optical devices integrated in the same substrate, but also on other optical devices connected directly to that substrate, for example, the influence on other waveguide devices and optical receiving and emitting elements can be suppressed. Therefore, the invention is very effective in achieving a highly integrated optical device, and expected to significantly contribute to the development of large-capacity optical networks that require various control of optical signals.

BRIEF DESCRIPTION OF DRAWINGS

FIG. 9A is a diagram schematically illustrating a waveguide device according to an eighth embodiment of the invention;

FIG. 9B is a diagram schematically illustrating a waveguide device according to an eighth embodiment of the invention;

FIG. 10A is a diagram illustrating an example of a detailed configuration when a 2×1 optical switch is realized by a waveguide device;

FIG. 10B is a diagram illustrating an example of a detailed configuration when a 2×1 optical switch is realized by a waveguide device;

FIG. 10C is a diagram illustrating an example of a detailed configuration when a 2×1 optical switch is realized by a waveguide device;

DESCRIPTION OF EMBODIMENTS

Embodiments of the invention will be explained in detail below with reference to the drawings. In the examples below, an optical device will be described which uses silica single mode optical waveguides formed on a silicon substrate will be explained. This is because this configuration is stable and easy for integration, as well as has superior compatibility with silica optical fiber, so a low-loss optical device can be provided. However, the present invention is not limited to this configuration.

Embodiment 1

Figure 1:
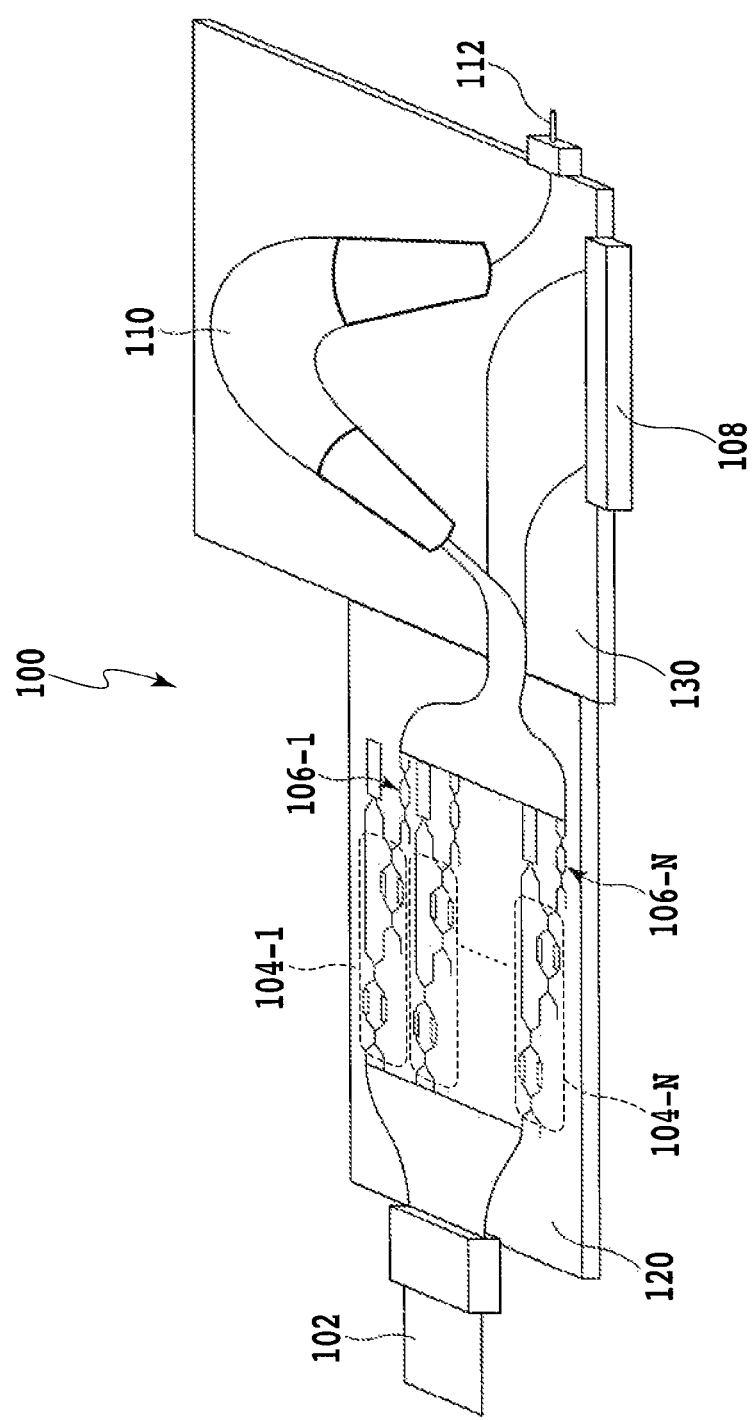
FIG. 1 is a diagram illustrating a configuration of a waveguide device according to a first embodiment of the present invention.

FIG. 1 is a diagram illustrating a configuration of a waveguide device according to an embodiment of the present invention. As illustrated in the figure, this device 100 is configured as a wavelength multiplexing device with an optical level adjustment function (VMUX: VOA equipped MUX) in which a substrate 120 including VOAs 104-1 to N is connected to a substrate 130 including an arrayed waveguide grating (AWG) 110. This device is employed, for example, in a WDM system. In this configuration example, the VOAs 104-1 to N and tap optical couplers 106-1 to N are integrated in a single substrate 120, and optical power monitor PDs 108 and AWG 110 are integrated in a separate single substrate 130.

Figure 2A:
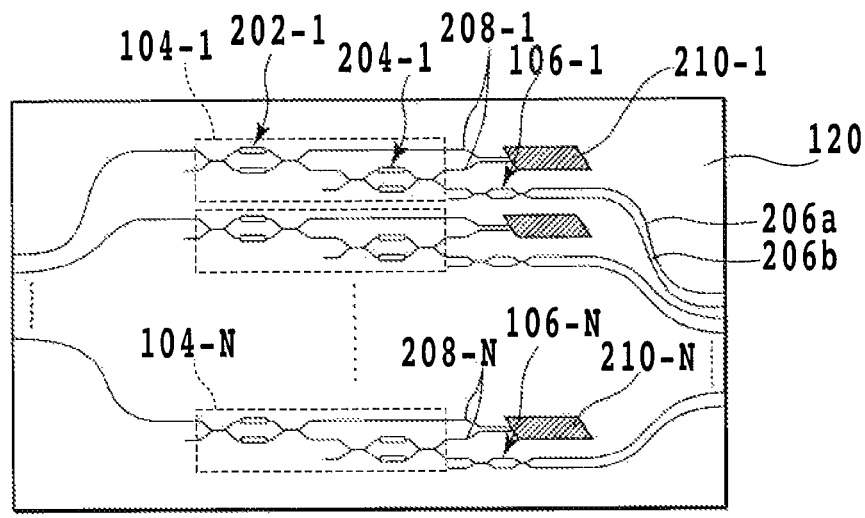
FIG. 2A is a diagram illustrating a circuit layout of a substrate that includes a variable optical attenuator in the waveguide device of FIG. 1.
Figure 2B:
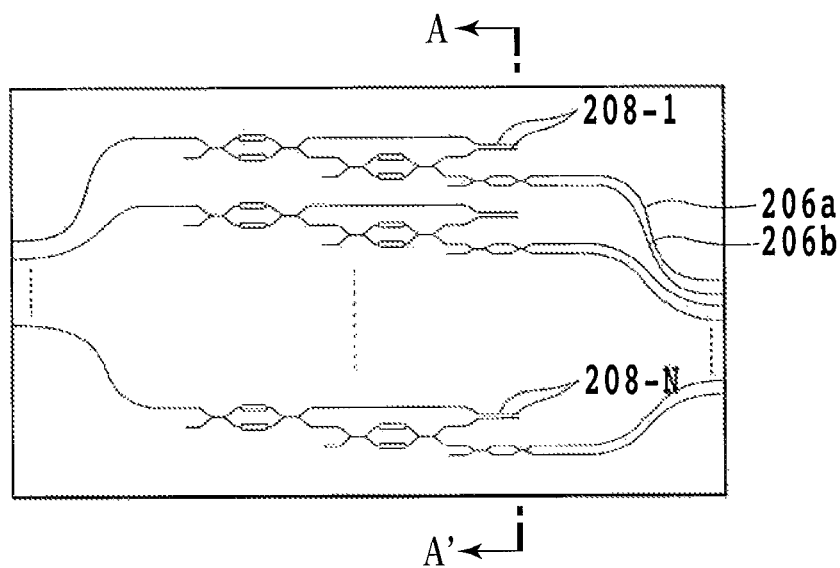
FIG. 2B is a diagram illustrating a circuit layout of a substrate that includes a variable optical attenuator in the waveguide device of FIG. 1.

FIG. 2A is a detailed circuit layout of the substrate 120 including VOAs 104-1 to N in this configuration example. In FIG. 1 and in FIG. 2A to FIG. 2C, to simplify the drawings, only thin-film heaters which drive the VOAs 104-1 to N are illustrated, and electric wirings for supplying power to the heaters, and heat insulating grooves (to be described later) are omitted. In order that the optical levels for a plurality of channels can be adjusted simultaneously, the VOAs 104-1 to N arranged in parallel comprise two stages of MZIs 202-1 to N, 204-1 to N connected in series, and the attenuation operation is performed by applying electric power to both MZIs. For the later stage in the VOAs 104-1 to N, wavelength independent couplers (WINCs) are connected as tap optical couplers 106-1 to N. In addition, the main ports 206a and tap ports 206b are extended to the end of the substrate to respectively connect to the AWG 110 and PDs 108 for monitoring the optical power level of each channel, integrated on a separate substrate 130. The excess light guided from each of the MZIs 202-1 to N, 204-1 to N to each of the dummy ports 208-1 to N by the attenuation operation of the VOA 104-1 to N is guided over the extended line from the dummy port to termination structure 210-1 to N which comprises a groove formed by removing the clad layer and core section at an arbitrary location on the substrate and material (light blocking material) attenuating the optical intensity in the groove, and is attenuated and terminated to a level that is no longer a crosstalk or stray light to other circuits or channels.

The light blocking material used in this embodiment is a mixture of silicone resin as a base material and carbon black which is typically used as a light blocking material. The optical power of the light incident to the light blocking material is mainly attenuated by absorption by the carbon black.

The substrate 120 including these VOAs 104-1 to N is manufactured by a process as described below. A single-mode optical waveguide having a clad layer and an embedded core section formed on a 1 mm thick 6-inch diameter silicon substrate using silica glass is manufactured by a combination of a silica glass film deposition technique, which utilizes a flame hydrolysis reaction of a raw material gas such as $SiCl_4$ or $GeCl_4$, and a reactive ion etching technique. Then, electrodes for the thin-film heaters and for power supply were formed on the surface of the clad layer by vacuum deposition and patterning. The normal core dimension of the manufactured optical waveguide was 7 μm×7 μm, and the relative refractive index difference Δ with the clad layer was 0.75%.

The VOA and WINC in this first embodiment use this kind of optical waveguides, and are formed by a combination of straight waveguides and curved waveguides. The thin-film heaters, formed on the surface of the clad layer as thermooptic effect phase shifters, had a 0.1 μm thickness, 20 μm width and 2 mm length. In addition, heat insulating grooves were formed along the thin-film heaters and were structured to efficiently transfer the heat generated from the thin-film heaters to the cores of the optical waveguides. The grooves for the termination structures 210-1 to N which are connected to the dummy ports of the VOAs 104-1 to N were formed at the same time as the process for the heat insulating grooves. In this embodiment, the groove size was 100 μm width and 1 mm length. The depth of the grooves was below the core section. However, the depth may reach the substrate. The overall length of the optical circuit comprising VOAs 104-1 to N and WINCs 106-1 to N in this first embodiment, configured with MZIs as the basic elements, was 50 mm.

The difference in the optical path length between the two arms of the MZI 202-1 to N, 204-1 to N constituting the VOA 104-1 to N is set to half-wave length of the propagating signal light, so that the signal light in the main path when power is not supplied to the VOA 104-1 to N is in a blocked state (maximum attenuation). In this embodiment, in order to process the WDM signal for each wavelength channel, the VOAs are arranged in parallel. However, for simplicity in design, the optical path length differences in all VOAs were unified to 0.75 μm, which is half the 1.55 μm, which is the center of the signal optical wavelength band of interest. However, it is noted here that in a more strict sense, the optical path length difference may be set for each VOA to correspond to the wavelength of propagating signal light.

By continuously changing the electric power applied to the thin-film heaters, the VOA 104-1 to N can set an arbitrary attenuation amount. Further, it is often desired that the extinction ratio, which is the difference in power of the light signal at the main port between the zero attenuation (maximum light output) state and the maximum attenuation (blocked light output) state, normally be 50 dB or greater, and when configured with only a 1-stage MZI, a sufficient extinction ratio may not be obtained. Therefore, in this embodiment, it was configured with a 2-stage MZIs connected in series, and an extinction ratio of 55 dB or greater was obtained.

Figure 2C:
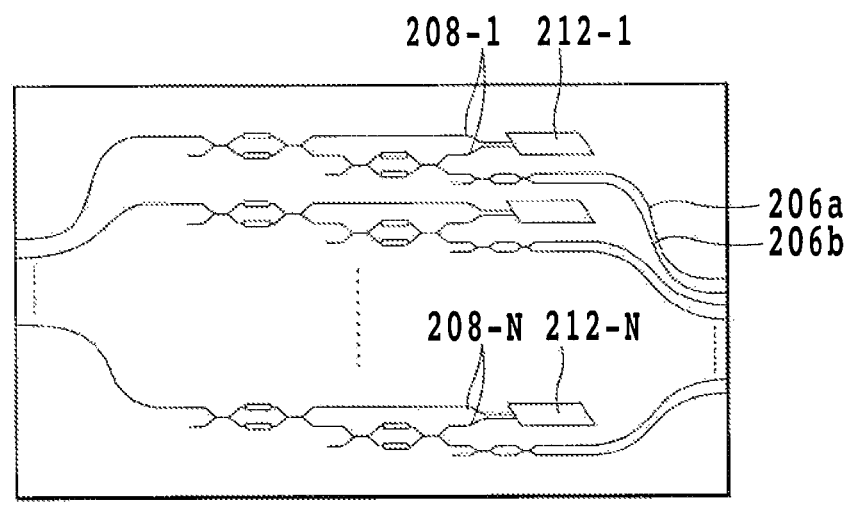
FIG. 2C is a diagram illustrating a circuit layout of a substrate that includes a variable optical attenuator in the waveguide device of FIG. 1.

In this embodiment, when the VOA attenuation is a maximum, the excess amount of optical power guided to the dummy port becomes a maximum, and when termination is not performed adequately, crosstalk occurs in WINC at the following stage or in the AWG substrate 130 connected directly to the VOA substrate 120, and has an adverse effect. In order to compare with the circuit of this embodiment illustrated in FIG. 2A (referred to as sample 1), a circuit in which the waveguide ends at the position of the section line A-A' in FIG. 2B without any termination structure in the dummy ports 208-1 to N (referred to as sample 2), and a circuit in which only grooves 212-1 to N as illustrated in FIG. 2C are adopted without any light blocking material (referred to as sample 3) were also manufactured at the same time. For the manufactured sample in this embodiment, in order to observe the effect of suppressing crosstalk by the termination structures 210-1 to N of the dummy ports 208-1 to N, the amount of crosstalk in channels adjacent to the signal light propagating channel was measured in the maximum attenuation (light output blocked) state of the VOA.

For sample 2 in which no groove or light blocking material for termination is used in the dummy ports 208-1 to N, crosstalk having a level of about −30 dB occurred at both the main ports 206a and tap ports 206b of the adjacent channels. This shows that the excess amount of optical power guided to the dummy ports 208-1 to N were all propagated in the clad mode at the end points of the dummy ports, and finally coupled with the waveguides of the adjacent channels and became crosstalk.

Even in sample 3 in which only grooves 212-1 to N are adopted at the end of the dummy ports 208-1 to N without any light blocking material, crosstalk into the adjacent channels were large, and crosstalk of about −40 dB, occurred at both the main ports 206a and the tap ports 206b. Although part of the optical power of the light emitted from the end surfaces of the waveguides in the grooves 212-1 to N is attenuated by reflection or scattering within the grooves, after propagated again as the clad mode, it can be seen that crosstalk has occurred as a result of coupling with adjacent waveguides.

On the other hand, for sample 1 in which the dummy ports 208-1 to N are terminated by the grooves and light blocking material filled within the grooves, the crosstalk to the adjacent channels showed a value less than −60 dB. It was confirmed that the excess optical power resulting from the light blocking of this invention was attenuated to a level that did not affect other circuits, and that suitable termination treatment was made.

Figure 3:
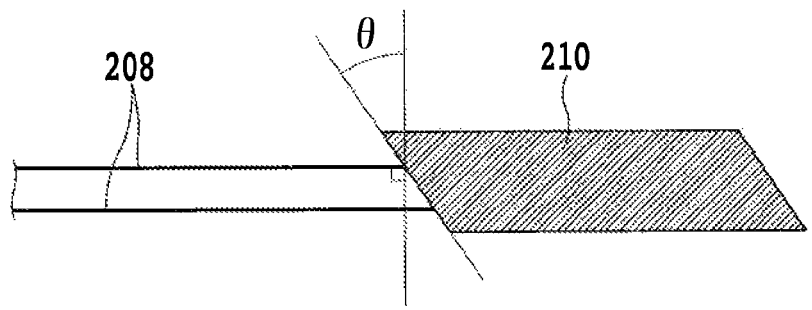
FIG. 3 is a diagram illustrating a shape in a horizontal plane of a substrate of a groove which terminates a waveguide according to a first embodiment of the invention.

As illustrated in FIG. 3, the shape of the grooves of the termination structures 210-1 to N is such that the angle (θ) of the incident plane to the groove with respect to the propagation direction of the terminated waveguide is 8 degrees. In this embodiment, the refractive index of the light blocking material, which is a mixture of silicone resin and carbon black, is nearly equivalent to that of silica glass, but taking into consideration the small refractive index difference, it was designed by adding an angle (θ) such that the return loss of the VOA was not affected. Actually, the optimum angle (θ) will be determined by taking into consideration the refractive index of the light blocking material, the placement space of the termination structures, and the processing precision of the grooves. When the return loss on the input side of the VOA 104-1 to N was measured on sample 1 manufactured according to this embodiment, a good characteristic of 50 dB or greater was confirmed.

Embodiment 2

In a second embodiment of the present invention, having the same configuration as illustrated in FIG. 1 and FIG. 2A, a light blocking material was used in the termination section of the dummy ports 208-1 to N of the VOAs 104-1 to N, which is a mixture of silicone resin as the base material and metal particulate powder which is also used as pigment. The optical power of the light incident to the light blocking material is mainly attenuated with light scattering by the metal particulate powder. The manufactured sample comprises silica based optical waveguides fabricated on a silicon substrate according to embodiment 1, and in order to prevent crosstalk coupling to adjacent optical waveguides, termination structures 210-1 to N are adopted introducing grooves and light blocking material. In this embodiment as well, the crosstalk to adjacent channels was −60 dB or less.

Moreover, when taking into consideration the refractive indexes of the light blocking material and the optical waveguide, the angle (θ in FIG. 3) of the incident planes to the grooves of the terminated waveguides is set to 15 degrees. In this case, the return loss on the input side of the VOA 104-1 to N showed a good characteristic of 50 dB or greater.

Embodiment 3 in embodiment 3 of the present invention, the configuration is the same as that of embodiment 2, and the angle (θ in FIG. 3) of the incident planes to the grooves of the terminated waveguides is set to Brewster's angle. The other configuration and the light blocking material are the same as those of embodiment 2. In this embodiment, Brewster's angle was calculated to be about 50 degrees. By setting the angle of the incident plane to the Brewster's angle, the polarized light component in the horizontal direction of the substrate all enter into the light blocking material, and part of the polarized light component in the vertical direction of the substrate are emitted into the waveguide substrate by reflection. In this manner, the effect of crosstalk due to emitted light is further reduced in all areas of the waveguide substrate. According to this embodiment, the crosstalk to adjacent channels was −65 dB or less, and the reflection attenuation on the input side of the VOA 104-1 to N also became 55 dB or greater. Further, it is clear that this embodiment can also be applied to the configuration other than embedment 2, such as embodiment 1. Therefore, depending on the placement space of the termination structures in the circuit, by setting the incident angle to the Brewster's angle as appropriate, more effective termination for the excess optical power can be achieved.

Embodiment 4

Figure 4:
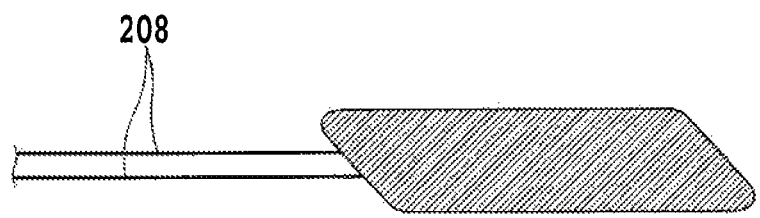
FIG. 4 is a diagram illustrating a shape in a horizontal plane of a substrate of a groove which terminates a waveguide according to a fourth embodiment of the invention.

Embodiment 4 of the invention has the same configuration as embodiment 1, and as illustrated in FIG. 4, the shape in the horizontal plane of a groove which terminates a dummy port 208 was formed by closed curves composed of only curved lines and straight lines connected smoothly without any apex points, and then light blocking material was introduced. The light blocking material used is a mixture of silicone resin and carbon black, and when manufacturing a sample, since the wall surface of the groove was formed smoothly, exfoliation of the light blocking material is difficult to occur, so long-term reliability was improved. In addition, the effect of reducing crosstalk was the same as in embodiment 1, with the crosstalk to adjacent channels being −60 dB or fewer. In this embodiment as well, the angle of the incident plane to the grooves in the termination section was set to 8 degrees, so the reflection attenuation on the input side of the VOA 104-1 to N was 50 dB or greater.

Embodiment 5

Figure 5A:
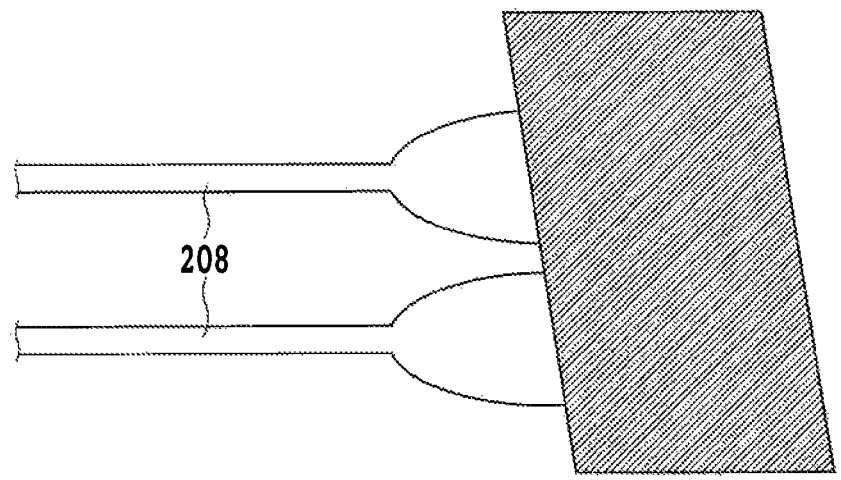
FIG. 5A is a diagram illustrating a taper shape of a waveguide which is terminated according to a fifth embodiment of the invention.
Figure 5B:
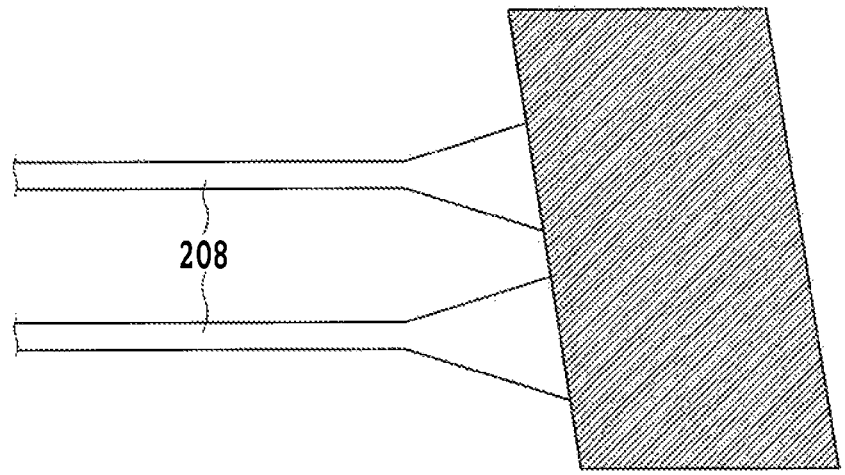
FIG. 5B is a diagram illustrating a taper shape of a waveguide which is terminated according to a fifth embodiment of the invention.

In embodiment 5 of the invention, the configuration is the same as in embodiment 1, and as illustrated in FIG. 5A and FIG. 5B, the shape of an optical waveguide in the termination section of a dummy pert 208 is a tapered shape. This was done for the purpose of reducing the power density of light entering into the light blocking material by expanding the mode field diameter of propagating light to be greater than that of a normal width optical waveguide in other locations. For example, in the case of attenuating the excess optical power of the VOA 104-1 to N by the light blocking material absorbing light, because of conversion of the optical power to heat, the temperature of the light blocking material rises. When this happens, the higher the power density becomes, more rapid local temperature elevation occurs, so that the silicone resin, which is the base material of the light blocking material, may be damaged. Particularly, in an optical device in a node system such as ROADM, the rated input optical power may be 200 mW (+23 dBm) or greater, and thus it is expected that, in one channel, the maximum excess optical power (during shutdown) guided to the VOA dummy port 208 will be about 10 mW (+10 dBm). The elevated temperature in the light blocking material at that time may exceed 300 degrees depending on the incident mode field diameter, which exceeds the allowable temperature range of silicone resin.

In this embodiment, for the two kinds of tapered shapes, the parabolic shape illustrated in FIG. 5A and the straight shape illustrated in FIG. 5B, the taper length of each was 100 μm and the taper width (incident side of the termination structure) was 30 μm, a light blocking material was used, which was a mixture of silicone resin and carbon black, and when the resistance to input power was observed, it was found that the blocking material was not damaged due to an input power of 10 mW (+10 dBm) for either shapes. Specifically, near the light input section, the light blocking material was cut with a cross section vertical to the incident direction of the light, and visually inspected.

According to this embodiment, it is clear to have sufficient resistance to high power, and to be applicable to node systems.

The taper length and width in this embodiment are only one example, and both values are determined according to the positional relationship and spacing of adjacent waveguides and other circuits, and are not limited to the values given in this embodiment. In other words, the taper length can be arbitrarily determined from several tens of μm to several mm. Moreover, even the taper width may be narrowed with respect to the normal optical waveguide width, so that the mode field diameter can be expanded. Therefore, from the aspect of expanding the mode field diameter as much as possible, the taper width can be arbitrarily set from 0 μm to 30 μl.

Figure 6:
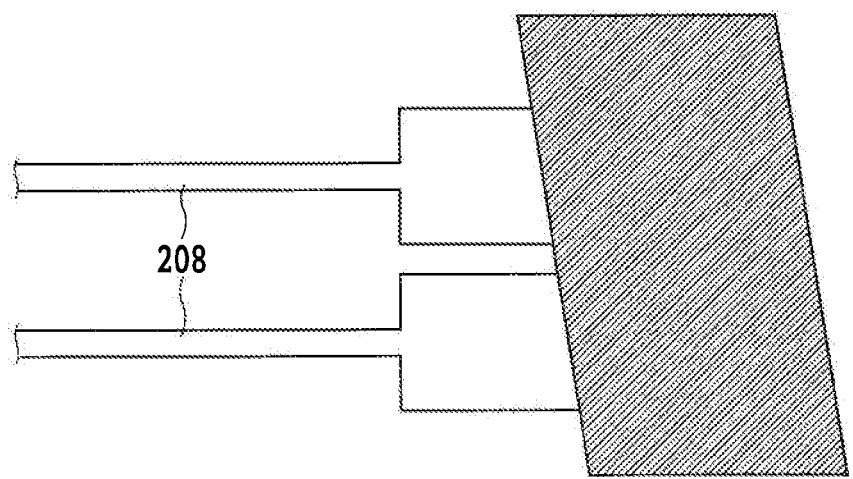
FIG. 6 is a diagram illustrating an MMI shape of a waveguide which is terminated according to a fifth embodiment of the invention.

Moreover, as illustrated in FIG. 6, even in the case where the shape of the waveguides at the termination section is taken to be a multi-mode interferometer, when the resistance to input power was similarly observed, it was confirmed that the light blocking material was not damaged for the shape with the interferometer length of 100 μm and the interferometer width of 30 μm, even at an input power of 10 mW (+10 dBm).

In the case with any shape, from the aspect of expanding mode field diameter, the same effect was expected and sufficient effect was obtained in each.

Embodiment 6

Figure 7A:
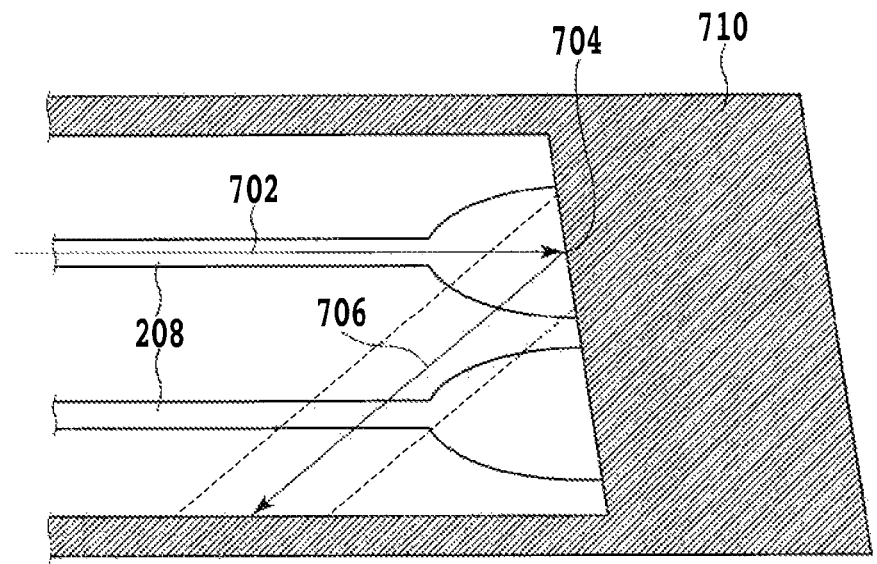
FIG. 7A is a diagram illustrating a termination structure which surrounds an optical waveguide according to a sixth embodiment of the invention.

In an embodiment 6 of the invention, as illustrated in FIG. 7A, the terminated optical waveguide is arranged such that it is surrounded in the horizontal plane of the substrate by grooves and light blocking material. This ensures that the reflected light occurring at the termination section of an optical waveguide does not affect other circuits and the like. In FIG. 7A, the structure 710 surrounding the terminated optical waveguide is arranged in a way that, when the incident light 702 is terminated at the end point 704 of the optical waveguide, and part of it becomes reflected light 706 having a fixed width (indicated by the dotted lines in the figure) which propagates in the substrate, but that reflected light 706 is to be blocked.

In embodiment 2 described above, since a mixture of a silicone resin and metal particulate powder was used as the light blocking material, a fixed amount of reflected light occurred due to the refractive index difference with the silica glass. However, by setting the angle of the incident plane with respect to the groove of the terminated optical waveguide to 15 degrees, most of the reflected light was emitted into the optical waveguide substrate without coupling with the terminated optical waveguide. In this case, even when the configuration of the termination structure with respect to the terminated optical waveguide is as illustrated in FIG. 3, FIG. 4, FIG. 5A, FIG. 5B or FIG. 6 for example, the emitted reflected light reached the end surface of the substrate while incurring a certain amount of attenuation, and was emitted into the air without coupling with the input/output optical fiber, which did not cause any problem with the circuit characteristics.

However, when integrating optical receiving parts such as a monitor PD on the end surface of a substrate or the top surface of a substrate in a waveguide device, provided with an optical waveguide termination structure in an arbitrary location, the reflected light may be received and detected as crosstalk, which can cause a problem with the circuit characteristics.

Therefore, a waveguide device having the termination structure illustrated in FIG. 7A was manufactured, with a mixture of silicone resin and metal particulate powder as the light blocking material, and crosstalk was measured using a PD at various locations (end surface, top and bottom surfaces) of the substrate. The result shows that the crosstalk was −60 dB or less at all locations with respect to light intensity input to the terminated waveguides. When comparing this with structure as illustrated in FIG. 5A, for example, it may depend on the circuit configuration and the location, there was an improvement of crosstalk of 10 dB or greater in some cases.

Figure 7B:
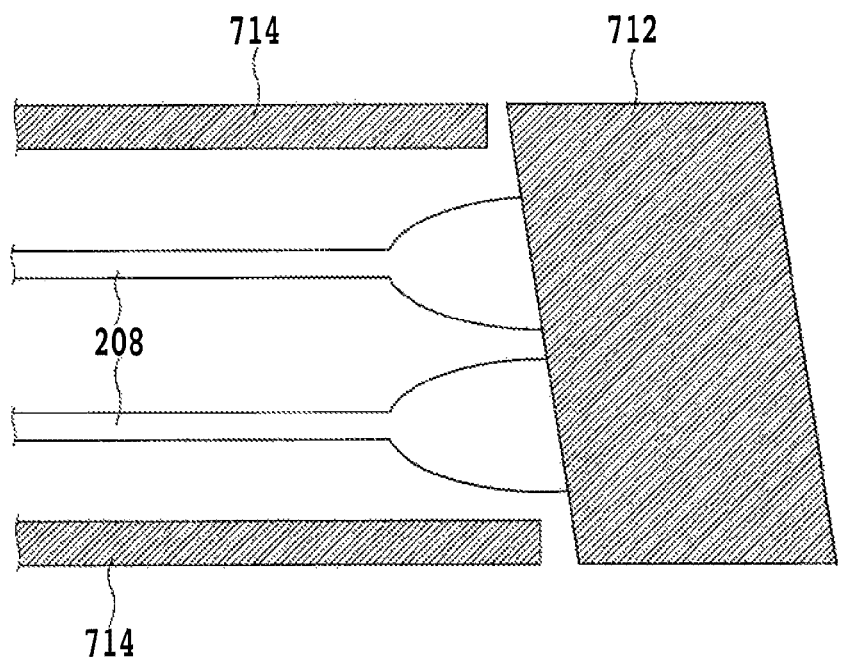
FIG. 7B is a diagram illustrating a termination structure which surrounds an optical waveguide according to a sixth embodiment of the invention.

In the configuration of this embodiment, since the objective is to block reflected light, the size, location and shape may be arbitrarily determined as long as it does not affect the layout of other circuits, etc. In addition, terminating section of the optical waveguide does not have to be continuous with the blocking section for the reflected light. For example, the effect of the invention is the same even for a shape as illustrated in FIG. 7B, for example, in which the structure 714 for blocking the reflected light is not geographically continuous with the termination structure 712 of the optical waveguide. In that case, the shape of each structure 712, 714 may be formed by a closed curve composed of only smooth curves and straight lines with no apex points, and the material may be absorbing or scattering the light. In FIG. 7A and FIG. 7B, the waveguide has a tapered shape. However, a shape other than this may be employed.

Embodiment 7

Figure 8A:
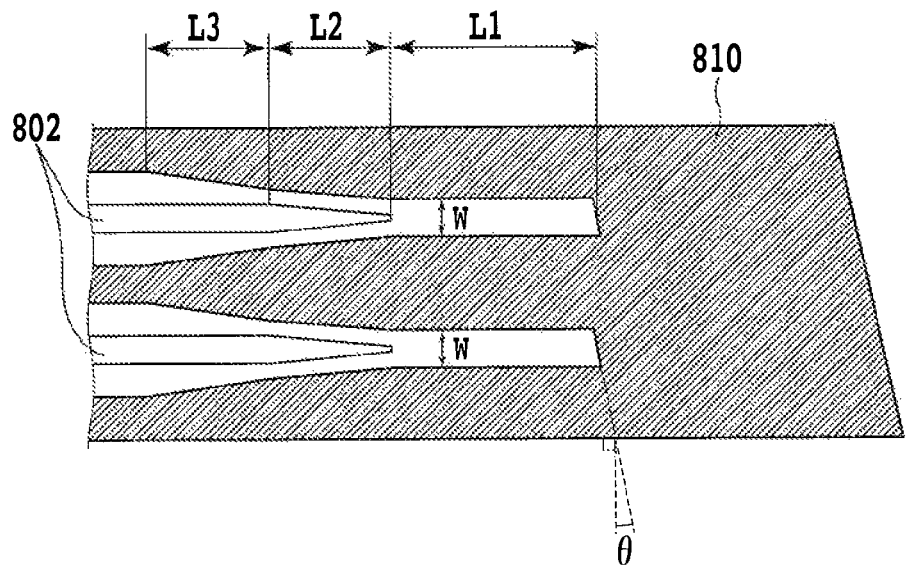
FIG. 8A is a diagram illustrating a termination structure which surrounds an optical waveguide according to a seventh embodiment of the invention.
Figure 8B:
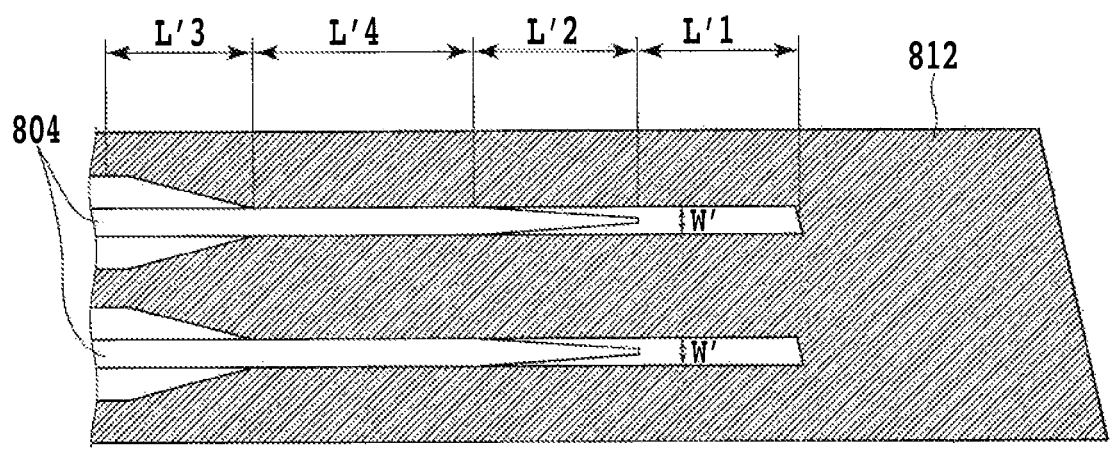
FIG. 8B is a diagram illustrating a termination structure which surrounds an optical waveguide according to a seventh embodiment of the invention.

FIG. 8A and FIG. 8B are diagrams illustrating the configuration of an embodiment 7 of the invention. In embodiment 5, it was described about the configuration which improves the resistance to high optical power input to the termination structure of a waveguide. However, when it is necessary to terminate optical power reaching the input power of several tens of mW, that resistance may not be sufficient.

Therefore, configuration illustrated in FIG. 8A can further improve the high power resistance. In this embodiment, the terminated optical waveguide 802 has a straight tapered structure in which the waveguide width becomes narrower toward the terminating end, and a groove shape 810 filled with light blocking material as illustrated in embodiment 6 is configured to surround the waveguide. Moreover, at the terminating location of the waveguide, the end point of the optical waveguide 802 and the termination structure 802 are connected via a gap by the clad layer having a distance L1. The distance L1 is set such that the light emitted from the terminating end of the waveguide is sufficiently absorbed by the termination structure, and is set to a value of 1 mm or less, for example. In this case, the shape is configured such that the taper length L2 was set to 500 and the spot size of the light propagating along the waveguide was rapidly changed by increasing the change rate of the waveguide width. Moreover, the distance L1 between the terminating point of the waveguide and the termination structure was set to 750 μm, and the incident angle θ of the light with respect to the termination structure was set to 15 degrees. The groove surrounding the terminated optical waveguide is shaped to gradually approach the optical waveguide at the section L3 in FIG. 8A, and is arranged closely such that in the straight tapered section, the distance from the center of the width of the optical waveguide to the groove is within a range from half the width of the waveguide (the groove comes in contact with the side wall of the waveguide core) to about the width of the waveguide, depending on manufacturing error and required attenuation. In this embodiment, the distance L3 was set to 250 μm, and the distance from the center of the optical waveguide at the starting location of the straight taper to the groove was set to 7 μm, which is the same as the waveguide width.

A sample was manufactured according to the configuration illustrated in FIG. 8A, using the light blocking material with a mixture of silicone resin and carbon black, and when the resistance to input power was observed, it was confirmed that the light blocking material was not damaged with an input power of 50 mW (+17 dBm).

According to the configuration of this embodiment, since light emission occurs due to the structure which converts the spot size rapidly at the straight taper, part of the optical power can be attenuated by the light blocking material surrounding the optical waveguide. Moreover, a large part of the optical power, of which the mode field is expanded by the taper, propagates over the optical waveguide. However, since the optical power enters into the termination structure via the gap by the clad layer at the terminating position, the optical power is further spread, and the sudden rise in temperature due to local light absorption inside the light blocking material can be mitigated.

In the configuration of this embodiment, the return loss on the input side of the VOA was measured and found to be 55 dB or greater. Crosstalk measurement was also performed using a PD at various locations of the substrate and was −60 dB or less at all locations with respect to the optical intensity input to the terminated optical waveguide.

In this embodiment, it is preferred that the taper of the optical waveguide is shaped with narrowing the waveguide width toward the terminating end. However, the width at the end can be arbitrarily set within a range that is narrower than the normal (other than the taper section) waveguide width. Moreover, for a straight tapered shape with narrowing width, by employing two different change rate of widths, shape with two stages of straight tapered sections being connected may be employed. It is within a scope of the present invention to use an optical waveguide taper having such shape.

Moreover, the distance of the gap by the clad layer between the end point of the optical waveguide and the termination structure is adjusted according to the placement space in the circuit and input optical power, and the appropriate range could be 1 mm or less. In other words, the distance is set so that the light emitted from the terminating end of the waveguide is sufficiently absorbed by the termination structure. Conversely, the distance in FIG. 8A may be 0 mm. However, in that case, the optical power maybe input to the termination structure locally, so sufficient high-power resistance may not be obtained. However, for the purpose of terminating the optical waveguide and suppressing crosstalk, this can be achieved as long as the light blocking material is not damaged.

In the configuration of FIG. 8A, a high-power resistance of several tens of mW was confirmed. However, when the power is higher, for example in the case of 100 mW (+20 dB) input, depending on the type of light blocking material, the resistance was not adequate in some cases. Therefore, by using the configuration illustrated in FIG. 8B, further improvement was attained for the high-power resistance. That is to say, the groove 812 surrounding the terminated optical waveguide 804 is in contact with the side wall of the optical waveguide core for just an arbitrary distance L'4, where this distance L'4 continues to the starting point of the straight taper of the optical waveguide 804. In addition, the straight taper of this optical waveguide 804 is shaped such that the width narrows towards the end point. Moreover, as in FIG. 8A, the end point of the optical waveguide 804 and the termination structure 812 are arranged with a gap by the clad layer. In this embodiment, the taper length L'2 was set to 500 μm, the distance L'1 of the gap was similarly set to 500 μm, and the width W' of the section sandwiched between grooves contacting with the side wall of the optical waveguide was constant up to the termination section 812. With this embodiment, from the instant that the grooves come in contact with the optical waveguide 804, part of the propagating optical power is emitted into the grooves and attenuated, and after the field is expanded toward the termination structure, the remaining optical power is attenuated and terminated in the termination structure. In this way, compared with the configuration described for the preceding embodiments, the optical power can be attenuated more gradually. A sample was manufactured according to the configuration of FIG. 8B, with a mixture of silicone resin and carbon black as the light blocking material, and when the resistance to input power was observed, it was confirmed that the light blocking material was not damaged with an input power of 100 mW (+20 dBm). In addition, the reflection attenuation on the input side was measured and found to be 55 dB or greater. In crosstalk measurement using PD at various locations on the substrate, the crosstalk was −60 dB or less at all locations with respect to the optical intensity input to the terminated optical waveguide. In the configuration of FIG. 8B, the width W' of the section sandwiched between grooves is constant. However, by making the shape such that the grooves come in contact with the side wall of the optical waveguide core even in the straight taper section, further improvement in the input power resistance may be attained. Moreover, in order to prevent deficient in the core pattern due to manufacturing error (position displacement, pattern shift) of the grooves in contact with the side wall of the core, a distance of about 1 to 5 μm between the grooves and the side wall may be provided by way of the clad layer as long as the propagation loss of the optical waveguide increases in the area near the grooves.

Embodiment 8

FIG. 9A is a diagram illustrating the configuration of a waveguide device according to an embodiment 8 of the invention. This device 900a constitutes a main functions of a ROADM system such that a waveguide device substrate 920a integrating a waveguide optical switch (not shown in the figure), VOA 902 and WINC 904 is directly connected with a waveguide device substrate 930 integrating an AWG and monitor PD.

Figure 14:
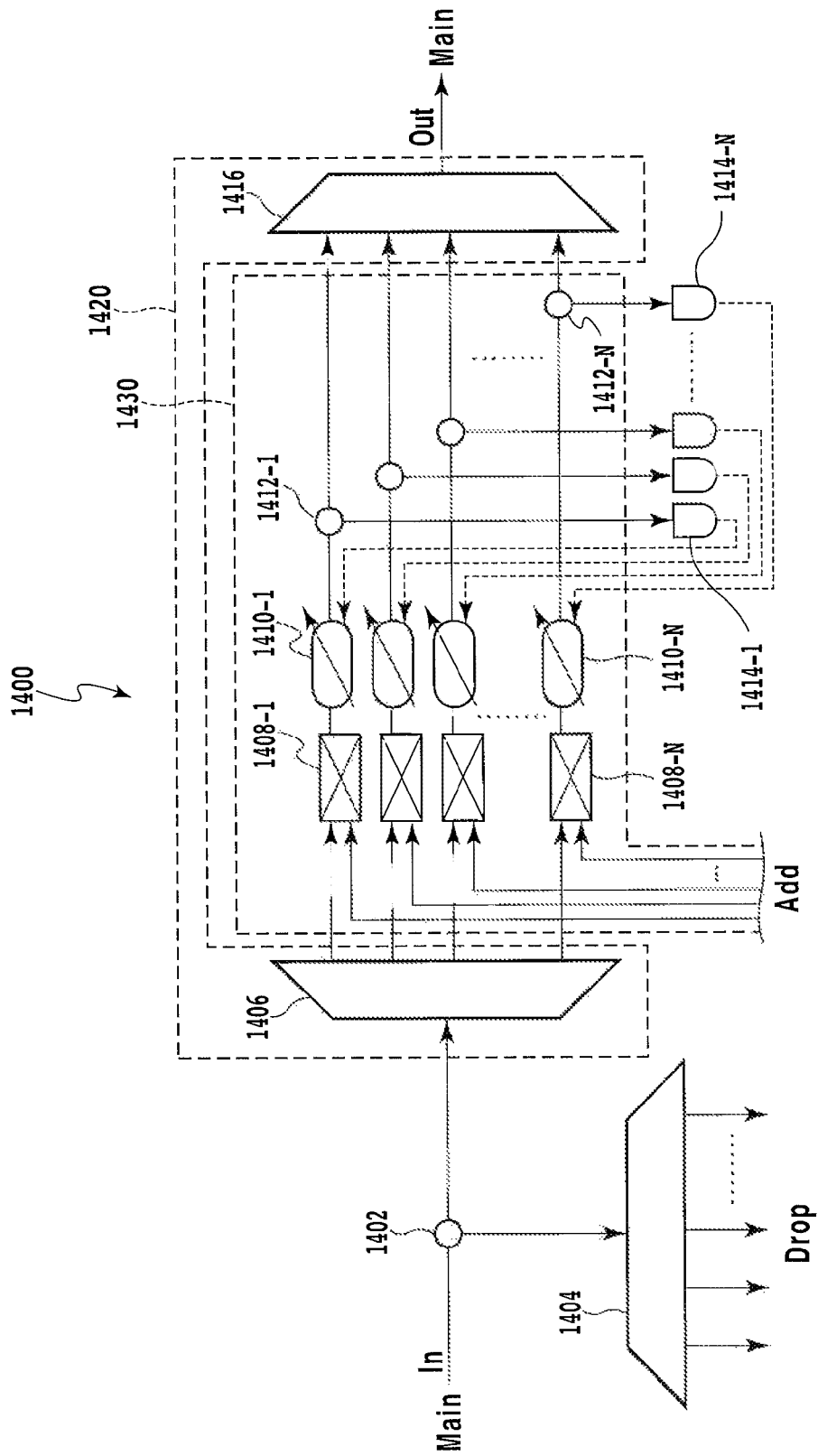
FIG. 14 is a circuit block diagram illustrating an example of a module configuration of waveguide devices which implement the main functions of a ROADM system.
Figure 15A:
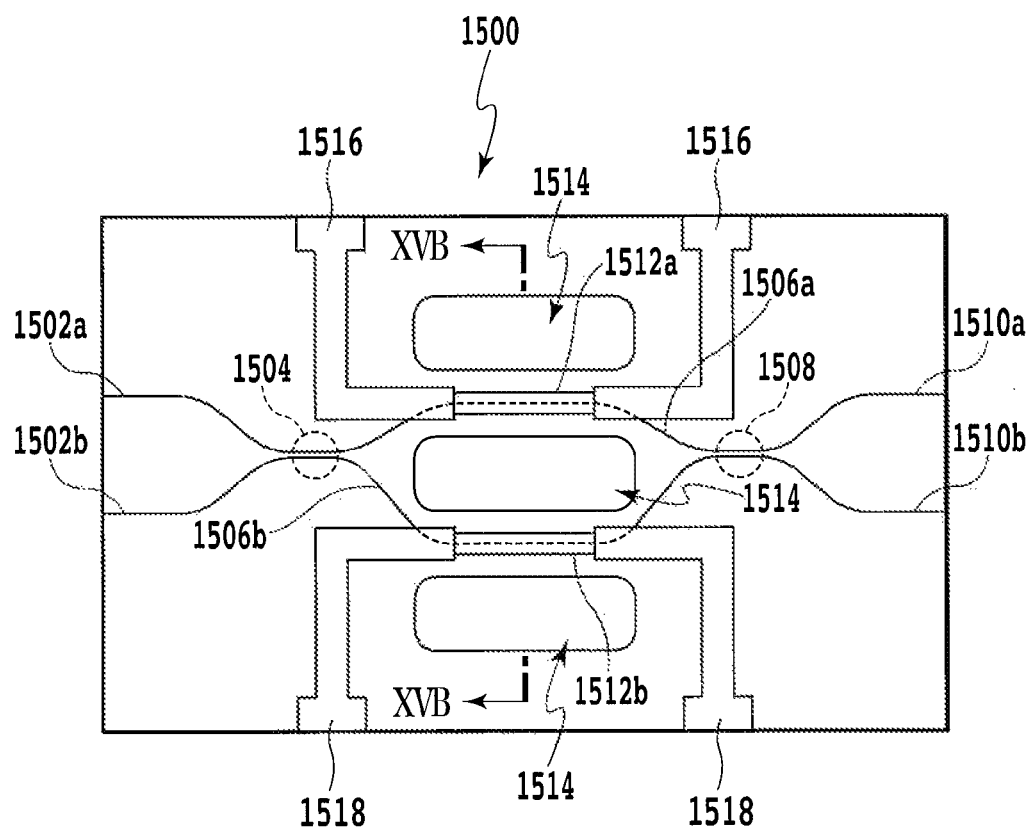
FIG. 15A is a diagram illustrating a basic configuration of a variable optical attenuator in a waveguide device.
Figure 15B:
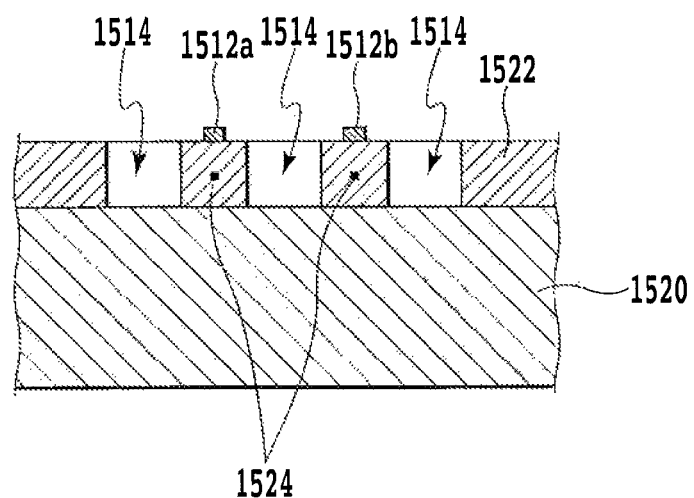
FIG. 15B is a cross-sectional diagram of a section line XVB-XVB in FIG. 15A.
Figure 16:
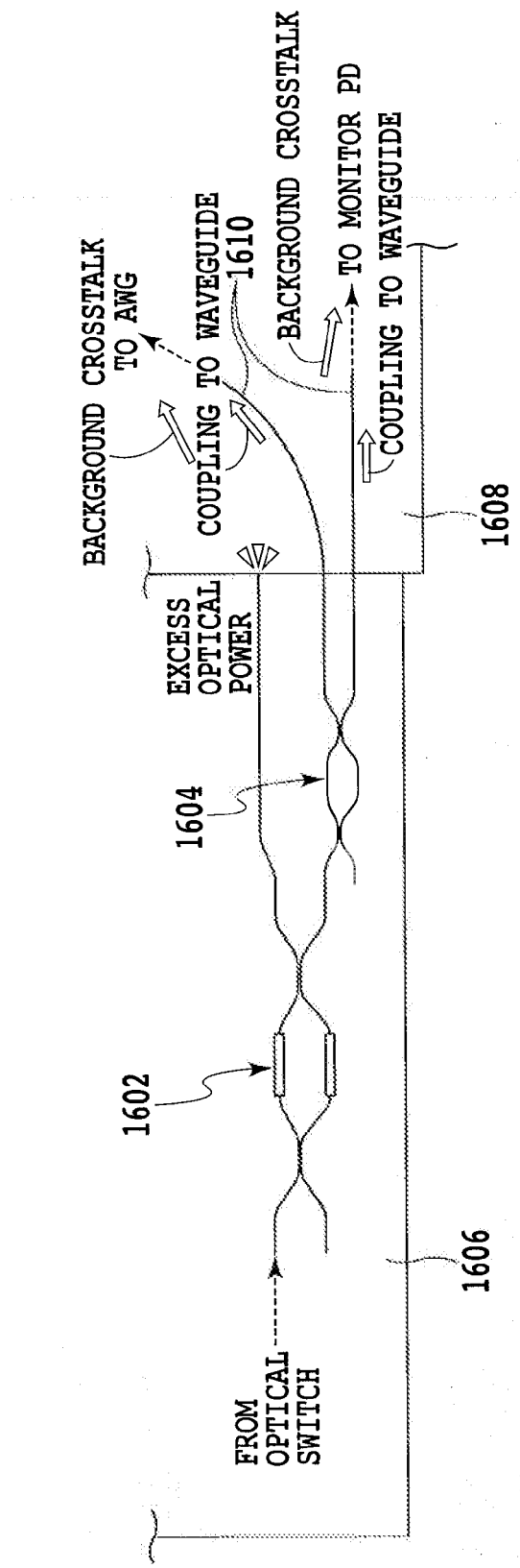
FIG. 16 is a diagram for explaining problems with excess optical power in a waveguide device using a multi-chip integration technique according to conventional art.

In this embodiment, the dummy port 906 of the VOA 902 is terminated with the termination structure 908a by the groove and light blocking material. In FIG. 9A and FIG. 9B a detailed description of the optical switch, AWG and monitor PD is omitted. However, the optical switch and AWG are both composed of the same optical waveguides as the VOA, and the monitor PD is connected to the end surface of the substrate. The optical switch has the function of the 2×1 switch 1408-1 to N in FIG. 14, and selects either the wavelength demultiplexed (DEMUX) optical signal path (main path) or the optical path (Add path) inserted (added) from a lower layer network. The optical level of the selected optical signal is adjusted by the VOA 902, then the optical signal is coupled to the AWG for wavelength multiplexing (MUX) via the WINC 904.

In this embodiment, epoxy resin and carbon black were used as the light blocking material of the termination structure 908a which terminates the dummy port 906 of the VOA. The crosstalk in both the AWG and monitor PD connected to the subsequent stage of the WINC 904 was measured, and was both −60 dB or less. In FIG. 9A, the angle of the incident plane of the optical waveguide with respect to the termination structure 908a is 0 degrees. However, in that case the measured return loss on the input side of the optical switch was 45 dB or greater. For comparison, as illustrated in FIG. 9B, when the angle of the incident plane with respect to the termination structure 908b was set to 8 degrees, the return loss became 50 dB or greater. In the case where the refractive index of the light blocking material (a mixed material) in embodiment 1 or this embodiment is close to that of silica glass, taking into consideration the size of the grooves in the horizontal plane of the substrate, a sufficient return loss characteristic is obtained even when the angle of the incident plane is 0 degrees. However, in the case where higher specifications are required, it may be necessary to adopt a configuration in which the reflected light is not coupled to the terminated optical waveguide, and a Brewster's angle or the like is most appropriate.

In either cases illustrated in FIG. 9A and FIG. 9B, when the shape of the grooves in the horizontal plane of the substrate is formed as a closed curve composed of curved and straight lines which are smoothly connected without any apex points, no exfoliation of the light blocking material from the wall surfaces of the grooves occurred, and long-term reliability was confirmed.

In FIG. 9A, the optical switch and VOA 902 are depicted as separate circuits, however, the function of the optical switch and VOA may be achieved simultaneously by using the same MZI, and the configuration illustrated in FIG. 9A is not intended to limit a configuration of the present invention. As an example of the configuration of an optical switch and VOA for ROADM, Patent Literature 1 and Non Patent Literature 1 can be referenced. According to Non Patent Literature 1, an optical switch on the through path side and an optical switch on the add path side each comprises MZIs directly connected in 2 stages. In this case, when one of the paths is selected, the optical level can also be adjusted at the same time by driving the 2-stage MZIs with continuous applied electric power. In that case, the dummy port led from each MZI can be terminated separately or collectively by the termination structures of the present invention comprising grooves and light blocking material, and thus prevent the excess optical power from affecting other circuits.

Embodiment 9

Figure 11:
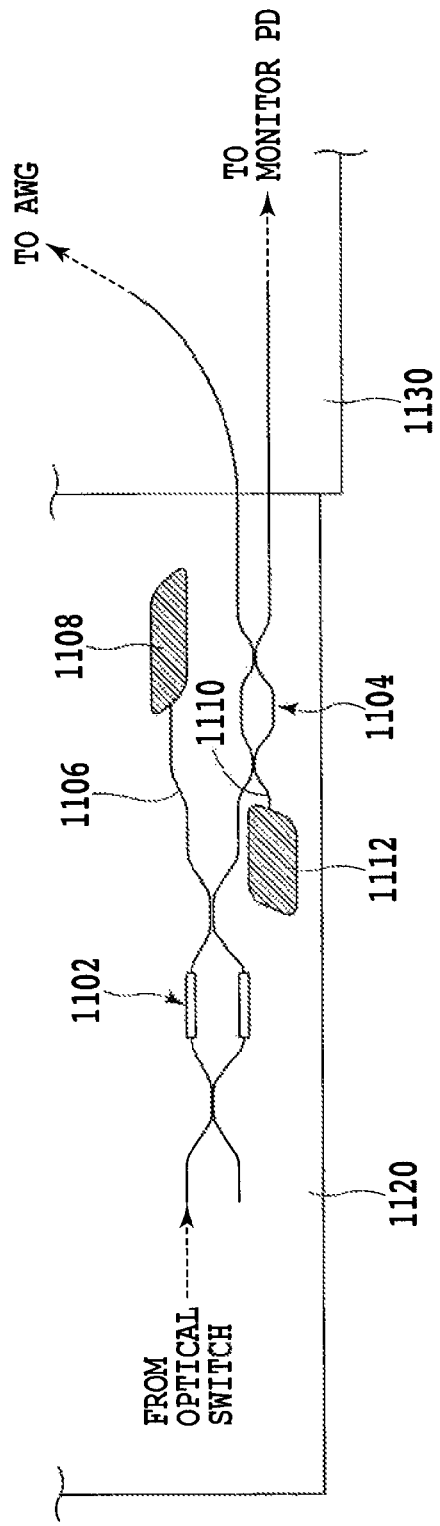
FIG. 11 is a diagram schematically illustrating waveguide devices according to a ninth embodiment of the invention.

FIG. 11 is a diagram illustrating configuration of a waveguide device according to an embodiment 9 of the invention. Similar to embodiment 8, this device constitutes a major function of a ROADM system such that waveguide device substrate 1120 integrating a waveguide optical switch, a VOA 1102 and a WIUNC 1104 is directly connected with a waveguide device substrate 1130 integrating an AWG and monitor PD.

In this embodiment, the dummy port 1106 of the VOA 1102 is terminated with the termination structure 1108 by the groove and light blocking material, and the dummy port 1110 on the input side of the WINC 1104 is also terminated with the termination structure 1112 by the groove and light blocking material. In this embodiment, the light blocking material used was a silicone resin as base material mixed with metal particulate powder. In addition, the incident angle with respect to groove was (θ=) 22.5 degrees in either cases. With this embodiment, not only crosstalk into other circuits by the excess optical power guided to the dummy port of the VOA by the attenuation operation can be suppressed, but also the influence on the coupling rate of a coupler can be suppressed when the crosstalk component caused by the connection loss occurred when another waveguide device or optical fiber is connected to the input section of the waveguide device substrate 1120, and the crosstalk component caused by the excess loss occurred in the optical waveguide of the optical switch and VOA 1102 are coupled with the dummy port 1110 on the input side of the WINC. In conventional configuration in which no termination structure 1112 is present in the dummy port 1110 on the input side of the WINC, a several % of coupling ratio error may occur with respect to the set coupling ratio of the WINC due to the effect of crosstalk occurred in an optical fiber connection or in the optical switch and VOA 1102, and thus a problem arises in feedback control by the monitor PD.

With such background, when error in the set coupling ratio for the WINC under the configuration of the present invention was measured, the error in the coupling ratio was within ±0.5%, and it was confirmed that by the effect of this invention, the influence of crosstalk on the WINC was sufficiently suppressed.

Moreover, the effect of suppressing the crosstalk by the termination structure 1108 of the dummy port 1106 of the VOA 1102 was also confirmed, and in all locations the crosstalk was −60 dB or less. Furthermore, the return loss on the input side of the optical switch was similarly 50 dB or greater.

The termination of the dummy port on the input side in this embodiment is not limited to a WINC, and for any optical circuit with configuration of having a dummy port on the input side such as an optical switch, VOA, of which basic element is a MZI, similar effect can be achieved, as suppressing the influence of crosstalk by terminating the dummy port on the input side.

Embodiment 10

In this embodiment, not in an optical switch and VOA described above, but in other waveguide devices, application of termination structure of an optical waveguide at any point on a substrate will be described.

Figure 12:
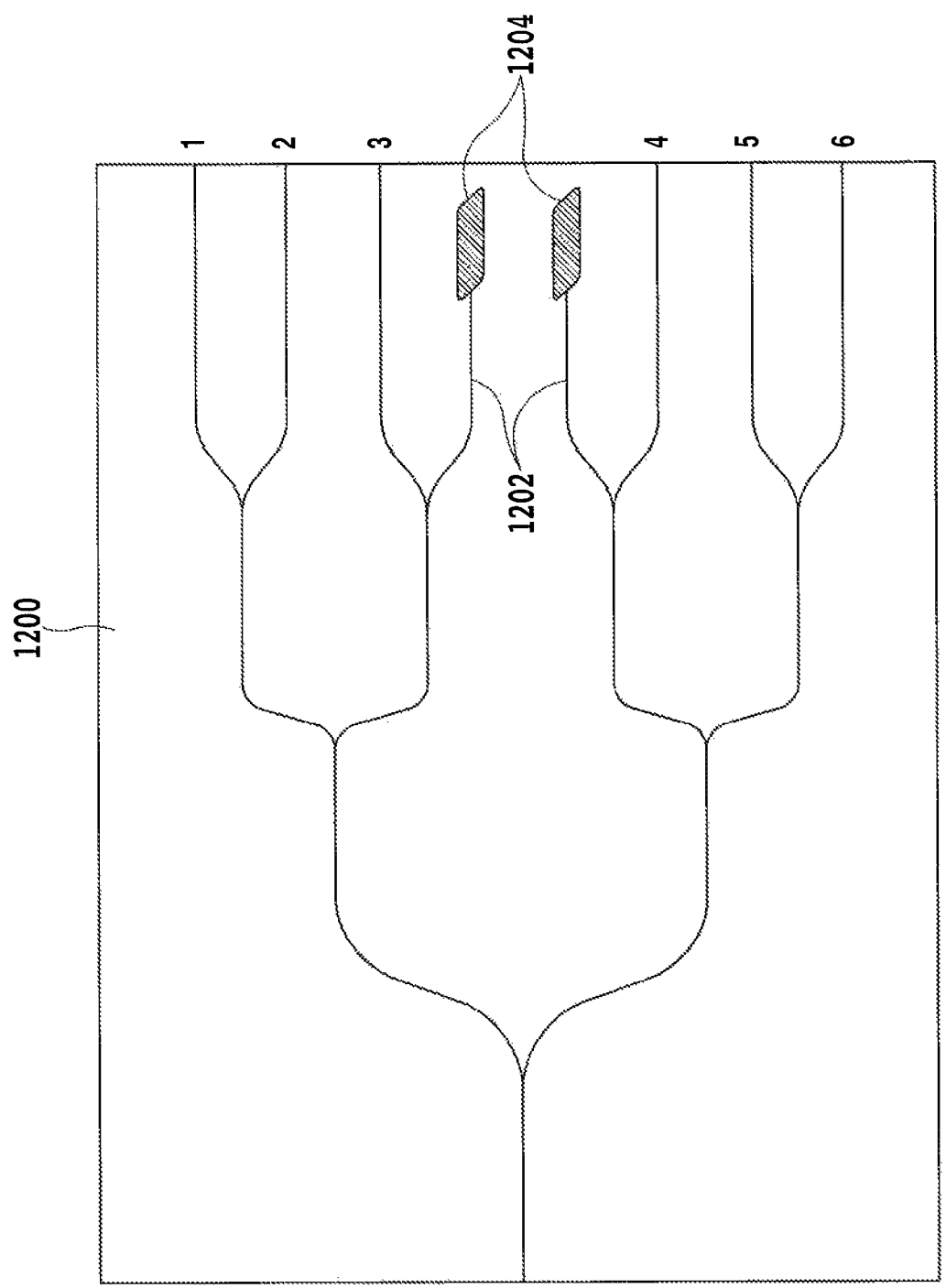
FIG. 12 is a diagram illustrating an example of a configuration of a 1×6 splitter according to a tenth embodiment of the invention.

FIG. 12 is an example of an optical splitter. For example, as a means to achieve a 1×6 splitter, configuration of FIG. 12 is illustrated. In this case, based on a 1×8 splitter 1200 as a basic configuration, by applying the termination structure 1204 of the present invention to two optical waveguides 1202 which are not used as output ports, crosstalk in the other output ports can be suppressed. In this embodiment, a 1×6 splitter based on the configuration of FIG. 12 was manufactured using optical waveguides fabricated using silica glass on a silicon substrate. For each output port (1 to 6 in FIG. 12) the optical spectrum was measured in the wavelength range 1300 nm to 1650 nm and the deviation of output power over the entire wavelength range between ports was a good characteristic of about 0.5 dB.

Figure 13A:
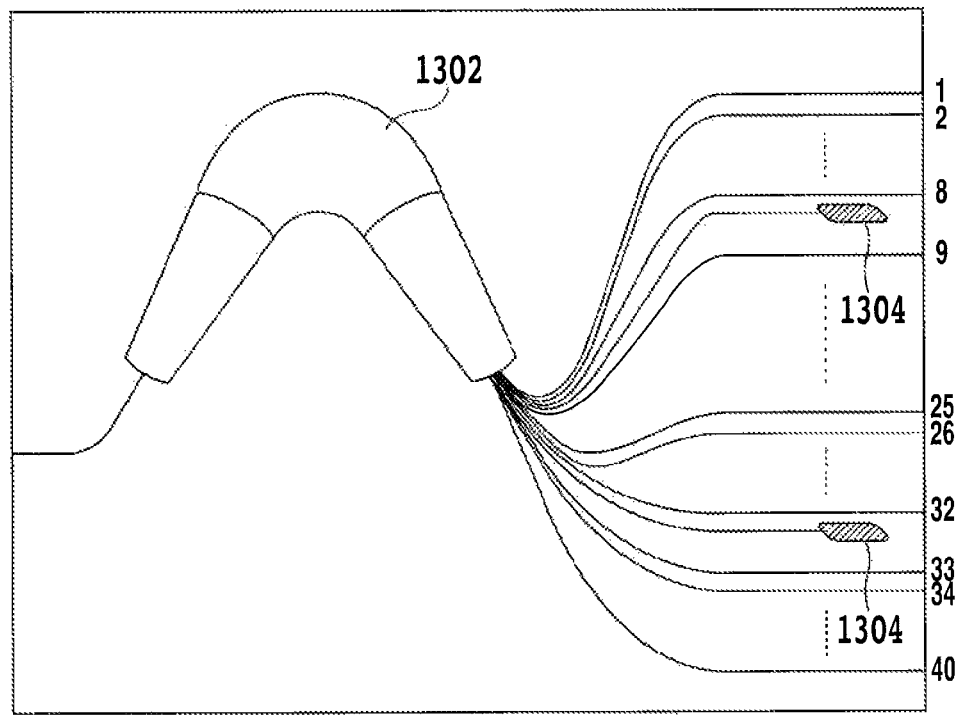
FIG. 13A is a diagram illustrating an example of a configuration of a 1×40 wavelength demultiplexing filter according to a tenth embodiment of the invention.
Figure 13B:
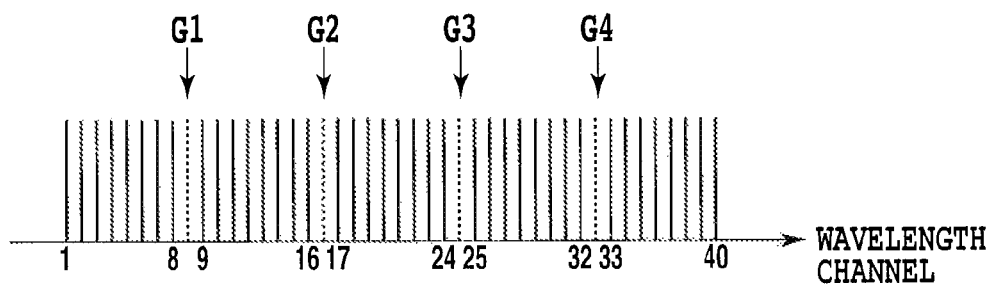
FIG. 13B is a diagram illustrating an example of transmission spectrum of a 1×40 wavelength demultiplexing filter according to a tenth embodiment of the invention.

FIG. 13A is an example of an AWG. For example, in an AWG 1302 having 1 input and N (N is a natural number) outputs, by terminating the optical waveguides on the output side per each certain interval of output ports using the termination structure 1304 of this invention, signal processing is possible in which optical signals for each of wavelength groups are separated, and wavelength group pairs are separated by one of ITU grid G1 to G4 (see FIG. 13B). In this example, an AWG substrate based on the configuration illustrated in FIG. 13A was manufactured using polymer waveguides fabricated on a silicon substrate. The AWG 1302 of this embodiment is configured to separate wavelength groups, where each group has the eight wavelengths, into five wavelength groups, for one input waveguide, 44 optical waveguides are arranged on the output side, in which one optical waveguides is terminated to separate wavelength groups by every eight optical waveguides. Wavelengths sandwiched between two wavelength groups (wavelengths to be terminated) are four in total, and in each case, the crosstalk in all of the ports except the terminated ports was −40 dB or less.

In embodiments 1 to 10 of the present invention, waveguide devices comprising silica glass and polymer material on a silicon substrate were described. However, the present invention is applicable to all waveguide type thermo optical circuits using other materials constituting the waveguide device, such as an ion diffusion type lithium niobate waveguide.

Moreover, for the grooves terminating the optical waveguides, the depth of the grooves was not particularly described. However, in a waveguide device using silica glass fabricated on a silicon substrate, for example, preferably the depth will reach the silicon substrate. However, the effect of the invention is obvious even when the depth is set arbitrarily as long as the manufacturing conditions, influence on other circuits and the like are taken into consideration; the depth is naturally required as a minimum to expose the core on the surface of the groove wall in the termination section of the optical waveguide, and other than this, in the configuration of the present invention, it is not limited to any specific depth.

The invention claimed is:

1. A waveguide device comprising a substrate on which is formed a termination structure filled with a light blocking material for terminating light from an end section of a waveguide,
wherein, with respect to a horizontal plane of the substrate, the end section of the waveguide is:
tapered with a parabolic shape having an increased width in a direction towards the termination structure; or
tapered with a straight shape having an increased width in a direction towards the termination structure; or
tapered with a straight shape having a decreased width in the direction towards the termination structure; or
in the form of a multimode interferometer,
wherein the termination structure is configured such that the incident angle with respect to light from the end section of the waveguide is inclined; and
wherein the incident angle is Brewster's angle.

2. The waveguide device according to claim 1, wherein the termination structure is configured to surround the end section of the waveguide.

3. The waveguide device according to claim 2, wherein the termination structure is arranged to be in proximity to or in contact with side wall of a core of the end section of the waveguide.

4. The waveguide device according to claim 3, wherein the light blocking material is comprised of a material that absorbs or scatters light from the end section of the waveguide.

5. A waveguide device comprising a substrate on which is formed a termination structure filled with a light blocking material for terminating light from an end section of a waveguide,
wherein, with respect to a horizontal plane of the substrate, the end section of the waveguide is:
tapered with a parabolic shape having an increased width in a direction towards the termination structure; or
tapered with a straight shape having an increased width in a direction towards the termination structure; or
tapered with a straight shape having a decreased width in the direction towards the termination structure; or
in the form of a multimode interferometer;
wherein the termination structure is configured such that the incident angle with respect to light from the end section of the waveguide is inclined,
wherein the termination structure is configured to surround the end section of the waveguide;
wherein the termination structure is arranged to be in proximity to or in contact with side wall of a core of the end section of the waveguide; and
wherein the termination structure is configured as a groove of which shape in a horizontal plane of a substrate has no apex points and is configured with curves.

6. The waveguide device according to claim 3, wherein the termination structure is configured as a groove of which shape in a horizontal plane of a substrate has no apex points and is configured with curves.

7. A waveguide device comprising a substrate on which is formed a termination structure filled with a light blocking material for terminating light from an end section of a waveguide,
wherein, with respect to a horizontal plane of the substrate, the end section of the waveguide is:
tapered with a parabolic shape having an increased width in a direction towards the termination structure; or
tapered with a straight shape having an increased width in a direction towards the termination structure; or
tapered with a straight shape having a decreased width in the direction towards the termination structure; or
in the form of a multimode interferometer;
wherein the termination structure is configured such that the incident angle with respect to light from the end section of the waveguide is inclined,
wherein the termination structure is configured to surround the end section of the waveguide;
wherein the termination structure is arranged to be in proximity to or in contact with side wall of a core of the end section of the waveguide; and
further comprising at least one of a Mach-Zehnder type optical switch, a variable attenuator, an optical splitter and an arrayed waveguide diffraction grating.

8. The waveguide device according to claim 3, comprising at least one of a Mach-Zehnder type optical switch, a variable attenuator, an optical splitter and an arrayed waveguide diffraction grating.

9. A multi-chip module integrated using a waveguide device comprising a substrate on which is formed a termination structure filled with a light blocking material for terminating light from an end section of a waveguide,
wherein, with respect to a horizontal plane of the substrate, the end section of the waveguide is:
tapered with a parabolic shape having an increased width in a direction towards the termination structure; or
tapered with a straight shape having an increased width in a direction towards the termination structure; or
tapered with a straight shape having a decreased width in the direction towards the termination structure; or
in the form of a multimode interferometer,
wherein the termination structure is configured such that the incident angle with respect to light from the end section of the waveguide is inclined;
wherein the termination structure is configured to surround the end section of the waveguide;
wherein the termination structure is arranged to be in proximity to or in contact with side wall of a core of the end section of the waveguide.

10. A multi-chip module integrated using the waveguide device according to claim 3.

11. An apparatus comprising:
a substrate;

a termination structure formed on the substrate, the termination structure being filled with a light blocking material;

a waveguide formed on the substrate, the waveguide extending between:
- an input end configured to receive an optical signal; and
- a termination end adjacent to the termination structure so that the termination structure absorbs light from the termination end of the waveguide, the termination end tapering when viewed from above the substrate as the termination end extends to the termination structure, wherein the termination end of the waveguide tapers outward as the termination end extends to the termination structure.

12. The apparatus of claim 11, wherein the termination end of the waveguide tapers outward in the form of a parabola as the termination end extends to the termination structure.

13. The apparatus of claim 11, wherein the termination end of the waveguide tapers outward linearly as the termination end extends to the termination structure.

14. An apparatus comprising:
a substrate;
a termination structure formed on the substrate, the termination structure being filled with a light blocking material;
a waveguide formed on the substrate, the waveguide extending between:
- an input end configured to receive an optical signal; and
- a termination end adjacent to the termination structure so that the termination structure absorbs light from the termination end of the waveguide, the termination end tapering when viewed from above the substrate as the termination end extends to the termination structure, wherein the termination structure comprises a groove formed by removing a clad layer and core section of the substrate, and wherein the light blocking material is positioned within the groove and comprises a material that attenuates the optical intensity of the light.

15. An apparatus comprising:
a substrate;
a termination structure formed on the substrate, the termination structure being filled with a light blocking material;
a waveguide formed on the substrate, the waveguide extending between:
- an input end configured to receive an optical signal; and
- a termination end adjacent to the termination structure so that the termination structure absorbs light from the termination end of the waveguide, the termination end tapering when viewed from above the substrate as the termination end extends to the termination structure;

the apparatus further comprising at least one of an optical switch, a wavelength filter, and an optical attenuator.

16. An apparatus comprising:
a substrate;
a termination structure formed on the substrate, the termination structure being filled with a light blocking material;
a waveguide formed on the substrate, the waveguide extending between:
- an input end configured to receive an optical signal; and
- a termination end adjacent to the termination structure so that the termination structure absorbs light from the termination end of the waveguide, the termination end having a shape of an interferometer when viewed from above the substrate.

17. The apparatus of claim 14, wherein the termination end of the waveguide tapers inward as the termination end extends to the termination structure.

* * * * *

UNITED STATES PATENT AND TRADEMARK OFFICE
CERTIFICATE OF CORRECTION

PATENT NO.       : 8,625,943 B2                                    Page 1 of 1
APPLICATION NO.  : 12/994280
DATED            : January 7, 2014
INVENTOR(S)      : Soma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this
Twenty-second Day of September, 2015

Michelle K. Lee
*Director of the United States Patent and Trademark Office*